United States Patent
Morein

(10) Patent No.: US 6,421,764 B2
(45) Date of Patent: *Jul. 16, 2002

(54) METHOD AND APPARATUS FOR EFFICIENT CLEARING OF MEMORY

(75) Inventor: Stephen L. Morein, Cambridge, MA (US)

(73) Assignee: ATI Technologies, Inc., Thornhill (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,218

(22) Filed: Aug. 27, 1998

(51) Int. Cl.[7] .............................................. G06F 12/00
(52) U.S. Cl. ...................................... 711/144; 711/156
(58) Field of Search ................................ 711/128, 133, 711/143, 144, 141, 142, 117, 154, 156, 159, 170

(56) References Cited

U.S. PATENT DOCUMENTS

| | | | | |
|---|---|---|---|---|
| 4,885,703 A | * | 12/1989 | Deering ....................... | 364/522 |
| 5,155,824 A | * | 10/1992 | Edenfield et al. ........... | 711/143 |
| 5,247,648 A | * | 9/1993 | Watkins et al. | |
| 5,278,484 A | * | 1/1994 | Hakala ........................ | 318/760 |
| 5,437,020 A | * | 7/1995 | Wells et al. ................. | 711/100 |
| 5,469,555 A | * | 11/1995 | Ghosh et al. ................ | 711/133 |
| 5,701,503 A | * | 12/1997 | Singh et al. ................. | 711/126 |
| 5,978,886 A | * | 11/1999 | Moncton et al. ............ | 711/118 |
| 6,008,820 A | * | 12/1999 | Chauvin et al. ............ | 345/502 |
| 6,032,228 A | * | 2/2000 | Islam et al. ................. | 711/133 |

* cited by examiner

*Primary Examiner*—Matthew Kim
*Assistant Examiner*—Christian P. Chace
(74) *Attorney, Agent, or Firm*—Vedder, Price, Kaufman & Kammholz

(57) ABSTRACT

A method and apparatus for clearing memory, or portions thereof in a fast and efficient manner begins by representing a group of memory locations by a representative value. When a particular group of memory locations is accessed, a determination is made as to whether the corresponding representative value is in first state. If so, a clear value is stored in each corresponding memory location of a cache memory. Note that the corresponding memory locations of the cache memory correspond to the group of memory locations. The processing continues by setting a dirty bit for the corresponding memory locations of cache when the representative value is in the first state. If, however, the representative value is in a second state, data is read from the group of memory locations into the corresponding memory locations of the cache memory. When a cache write-back command is received, the data, or clear values, stored in memory are written from the cache memory into the main memory.

16 Claims, 4 Drawing Sheets

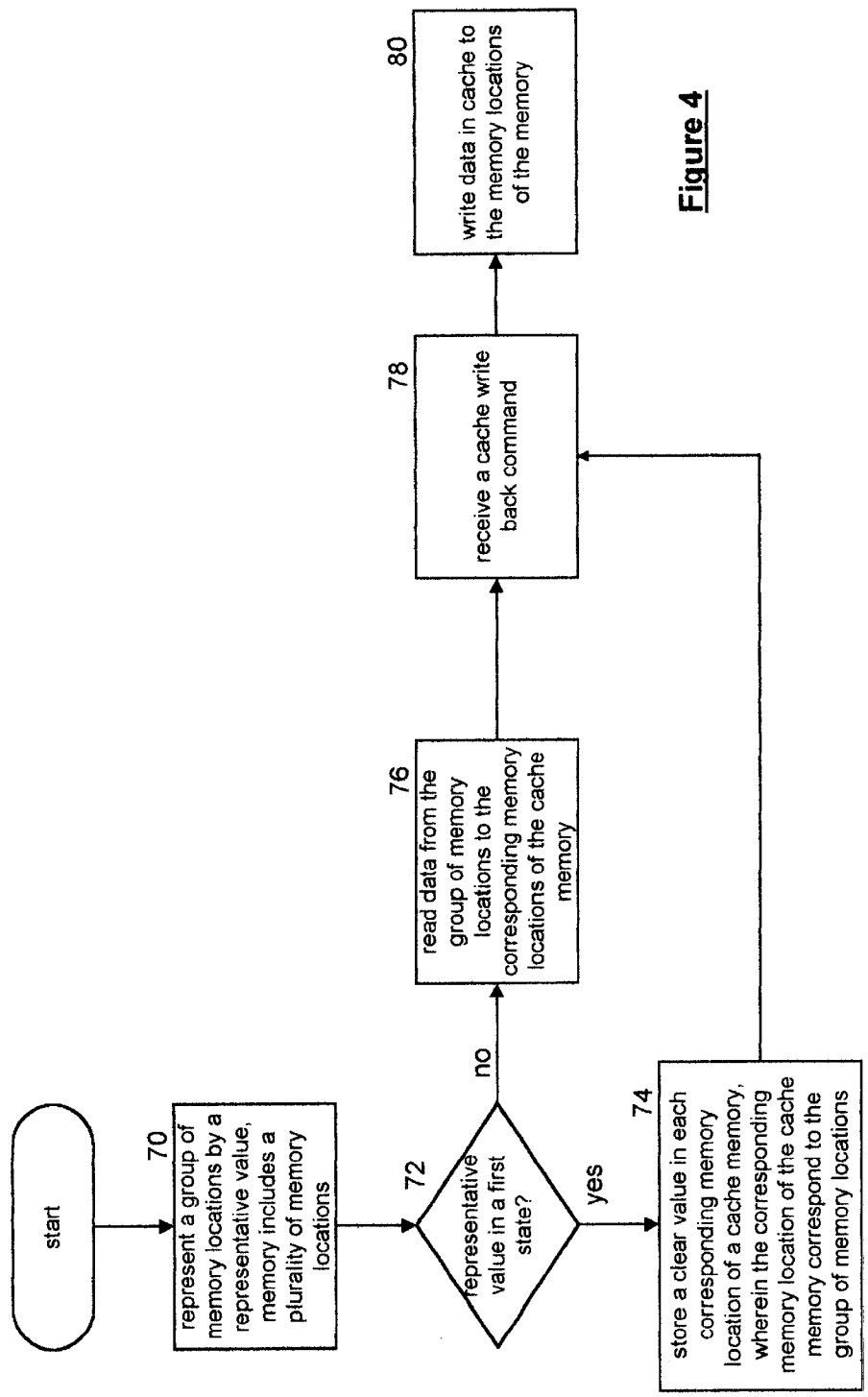

METHOD AND APPARATUS FOR EFFICIENT CLEARING OF MEMORY

TECHNICAL FIELD OF THE INVENTION

This invention relates generally to memory devices and more particularly to a fast and efficient means for clearing memory.

BACKGROUND OF THE INVENTION

Computers are known to include a central processing unit, system memory, video graphics circuitry, audio processing circuitry, and peripheral ports. The peripheral ports enable the central processing unit to interact with peripheral devices such as printers, monitors, external tape drives, etc. As such, when the central processing unit is executing an application, the central processing unit may interface with any of the peripheral devices and/or with the system memory, video graphics circuitry, and audio processing circuitry. The programming instructions to execute such applications are stored in the system memory, on floppy disk, etc.

The video graphics circuitry includes memory that is used for intermediate processing of data for display on the computer monitor and for storing programming instructions that are executed by the video graphic circuit. In preparing data for presentation on the monitor, the video graphics circuitry receives data from the central processing unit, which outlines the images to be displayed. The video graphic circuit processes the data utilizing a frame buffer and a Z buffer. The frame buffer stores pixel data that is subsequently displayed. The Z buffer is used to track the depth relationship between objects as they are rendered. For example, a Z value may range from 0 to 1 where a value of 0 represents the most foreground position and the value of 1 represents the most background position. The resolution of the Z values is dependent upon bit size of the values.

While processing images for subsequent display, it is advantageous at times for the video graphics circuitry to clear the Z buffer and/or the frame buffer, or portions thereof For example, the buffers may be cleared when a page flip occurs, i.e., begin processes a next frame of graphics data. The clearing of the buffers may be done in a variety of ways. For example, the buffers may be cleared by writing a word directly into the memory, where the word is representative of null data. To make the writing of null data more efficient, the word may be designated for one location. The memory controller would then cause the null word to be written into a plurality of memory locations. An alternative clearing technique is to indicate that the memory locations of the buffers are available and are subsequently overwritten with new data.

While each of these memory clearing techniques works to clear memory, they require additional processing steps and/or the memory controller to be configured to provide such writing. Therefore, a need exists for a method and apparatus that provides more efficient memory clearing process.

BRIEF DESCRIPTION OF THE DRAWING

FIG. 4 illustrates a logic diagram of an alternate method for clearing memory in accordance with the present invention.

DETAILED DESCRIPTION OF A PREFERRED EMBODIMENT

Generally, the present invention provides a method and apparatus for clearing memory, or portions thereof, in a fast and efficient manner. Such processing begins by representing a group of memory locations by a representative value. Typically, the memory will include a plurality of groups of memory locations. When a particular group of memory locations is accessed, a determination is made as to whether the corresponding representative value is in first state. If so, a clear value is stored in each corresponding memory location of a cache memory. Note that the corresponding memory locations of the cache memory correspond to the group of memory locations. For example, a line of cache memory may correspond to a group of memory locations within a main memory. The processing continues by setting a dirty bit for the corresponding memory locations of cache when the representative value is in the first state. If, however, the representative value is in a second state, data is read from the group of memory locations into the corresponding memory locations of the cache memory. When a cache write-back command is received, the data, or clear values, stored in memory are written from the cache memory into the main memory. With such a method and apparatus, portions of a main memory may be cleared in a fast and efficient manner by utilizing a representative value. By caching a clear value, the memory block portion is cleared during a typical cache write back command, thus minimal additional processing is required.

Figure 1:
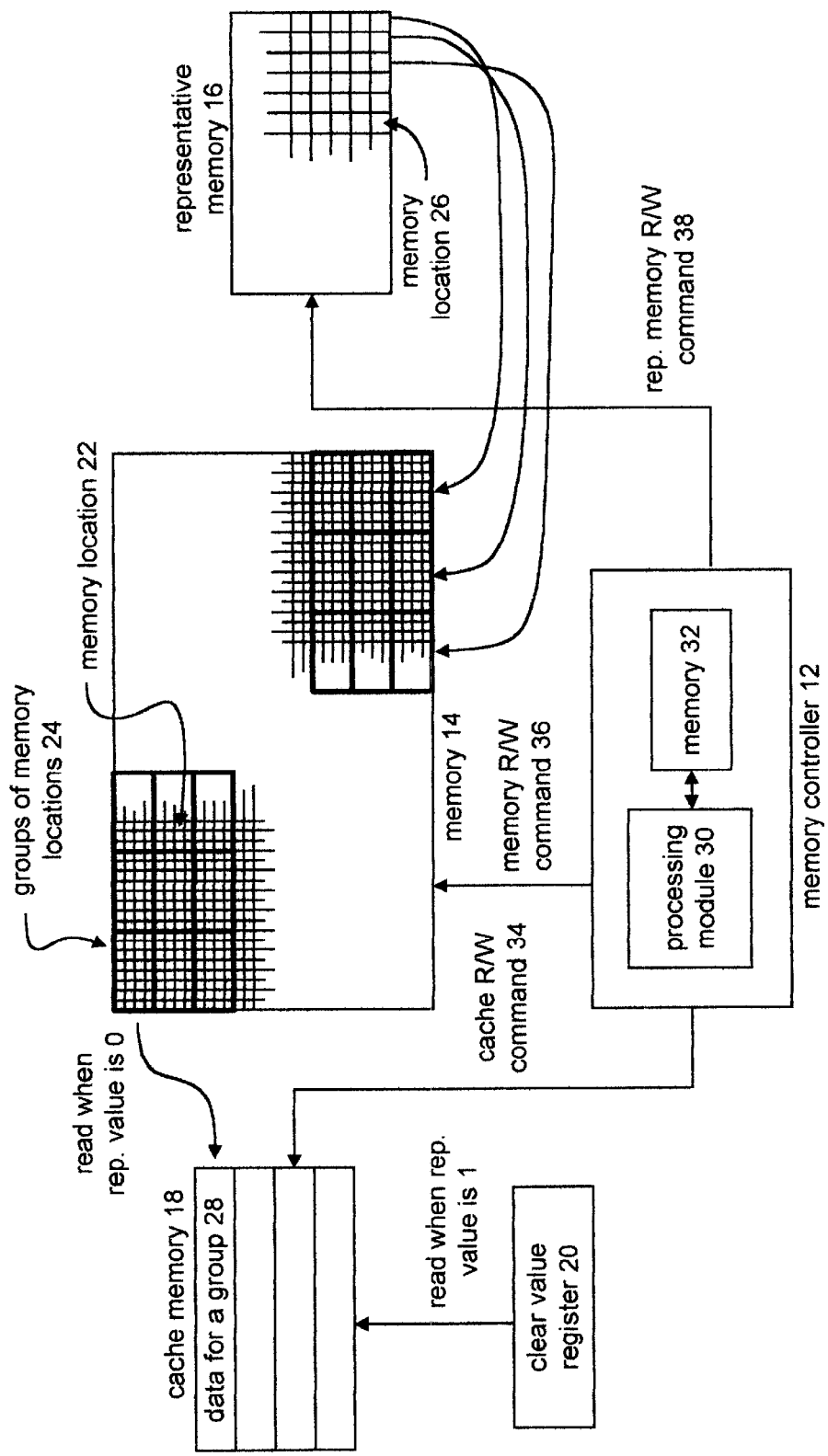
FIG. 1 illustrates a schematic block diagram of a memory system in accordance with the present invention.

The present invention can be more fully described with reference to FIGS. 1 through 4. FIG. 1 illustrates a schematic block diagram of a memory system 10 that includes a memory controller 12, a main memory 14, a representative memory 16, a cache memory 18, and a clear value register 20. The memory devices 14, 16 and 18 may be random access memory devices and have a corresponding relationship. The relationship between memories 14, 16 and 18 is based on the number of memory locations in each of the respective memories. As shown, representative memory 16 includes a plurality of memory locations 26. Each of the memory locations 26 of the representative memory 16 corresponds to a group of memory locations 24 of main memory 14. Each group of memory locations 24 is comprised of a plurality of memory locations 22. The cache memory 18 includes a plurality of memory blocks, wherein each of the memory blocks has sufficient storage capacity to store the data for a group of memory locations 28. As such, when the data corresponding to a group of memory locations is being processed, a cache line within the cache memory 18 is used for such data 28.

The memory controller 12 includes a processing module 30 and memory 32. The processing module 32 may be a single processing entity or a plurality of processing entities. Such a processing entity may be a microprocessor, microcomputer, microcontroller, digital signal processor, central processing unit, state machine and/or any device that manipulates digital information based on operating instructions. The memory 32 may be read-only memory, random access memory, floppy disk memory, DVD memory, CD memory, hard disk memory and/or any device that stores digital information. Note that if the processing module includes a state machine to perform one or more of its functions, the operating instructions of memory 32 are embedded within the logic circuitry that comprises the state machine. The operating instructions stored in memory 32 and the execution thereof by processing module 30 will be discussed in greater detail with reference to FIGS. 3 and 4.

In general, the memory controller 12 coordinates the caching of data from the memory 14 and the clearing of groups of memory locations within memory 14. When data corresponding to a group of memory locations is to be processed, the memory controller interprets a corresponding memory location 26 within the representative memory 16. If the representative value is in a first logic state (e.g., a logic 1), the memory controller 12 causes a clear value to be read from the clear value register 20 into the line of the cache memory 18 corresponding to the group of memory locations. If, once the cache memory 18 includes a full line of the clear values, the memory controller toggles the representative bit in the representative memory 16. This is done via the representative memory read/write command 38. The memory controller controls the storage and retrieval of data from the cache memory 18 via the cache read/write command 34. Similarly, the memory controller 12 controls the reading and writing data from memory 14 via the memory read/write command signal 36.

When the corresponding representative value for a group of memory locations is in a second state (e.g., a logic 0), the data is read from the group of memory locations into the cache memory line. In this situation, the dirty bit corresponding to the line of cache is not set, indicating that the data in the line of cache matches the data in the group of memory locations.

When the memory controller 12 processes a cache write-back command, the data stored in the corresponding line of the cache memory 18 is written into the group of memory locations. If the data stored in the cache line is the clear value, the group of memory locations has been cleared since they are storing the clear value. If, however, the line of cache memory is storing the data, which was retrieved from the group memory locations, the data is written back into the corresponding group of memory locations.

In a video graphics environment, where the memory 14 is representative of a Z buffer, the representative memory and cache memory may be memory devices stored on chip of the video graphics circuitry. By including the representative value memory on chip, on-chip memory is substantially reduced while obtaining a fast and efficient mechanism for clearing portions of the memory. The Z buffer contains relative depth information to determine depth relationships between object elements, done by Z buffering, W buffering and range based.

Figure 2:
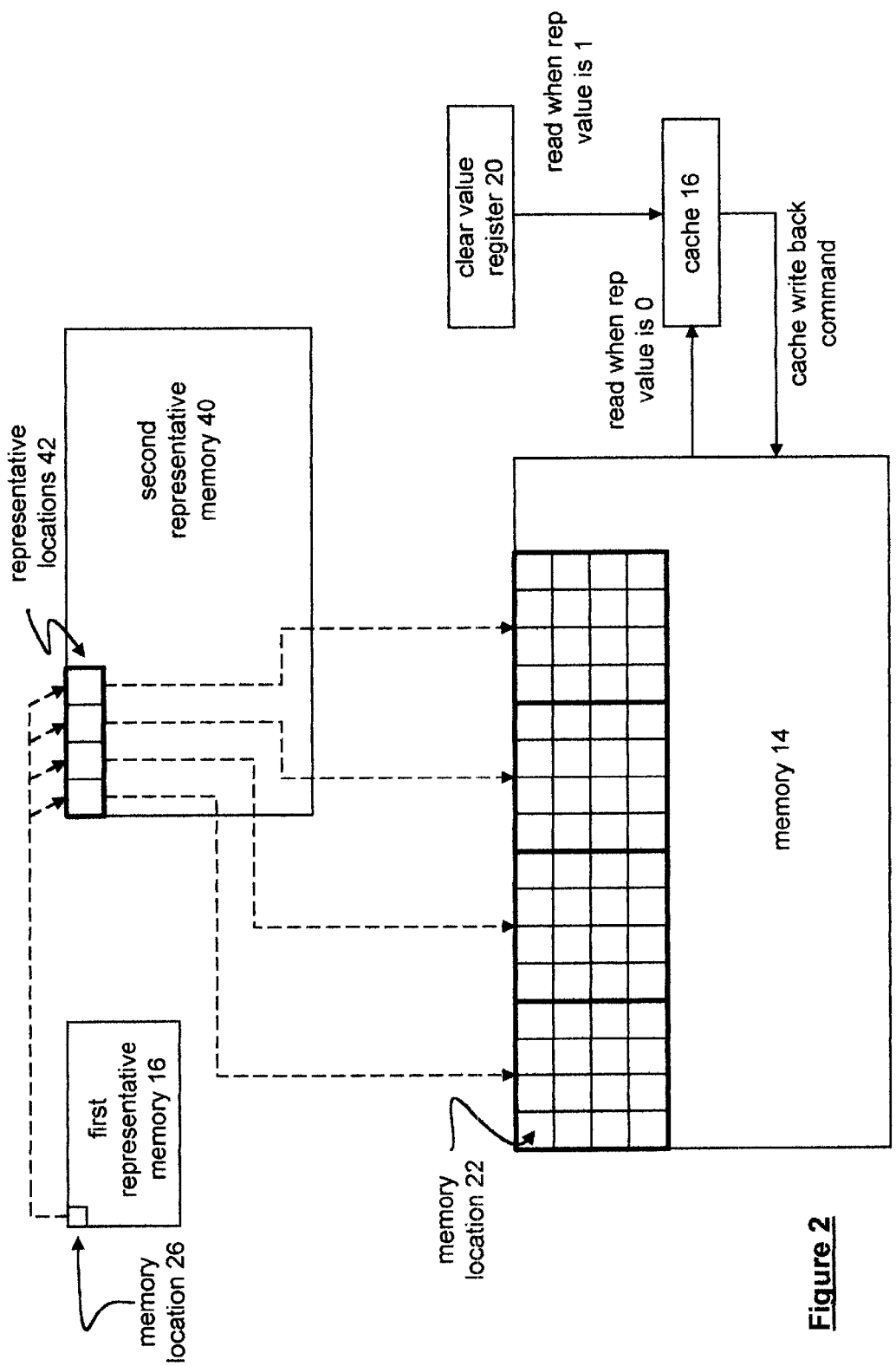
FIG. 2 illustrates a hierarchical memory configuration in accordance with the present invention.

FIG. 2 illustrates a hierarchical memory configuration for the memory system 10. As shown, the memory system includes a second representative memory 40. The first representative memory 16 includes a plurality of memory locations that maps a plurality of representative locations 42 to groups of representative locations 42 of the second representative memory 40. Each of the representative locations 42 in a group of representative locations corresponds to a group of memory locations of memory 14. As such, the first representative memory stores a single bit which indicates, in a hierarchical manner, whether the corresponding groups of memory locations in memory 14 are to be cleared or not cleared. The hierarchical memory configuration provides an advantage when the number of memory locations within a group of the memory 14 is relatively small, since groups of groups may be represented by a single bit of the first representative memory 16. Thus the first representative memory 16 can remain small, making it convenient to put on chip.

Figure 3:
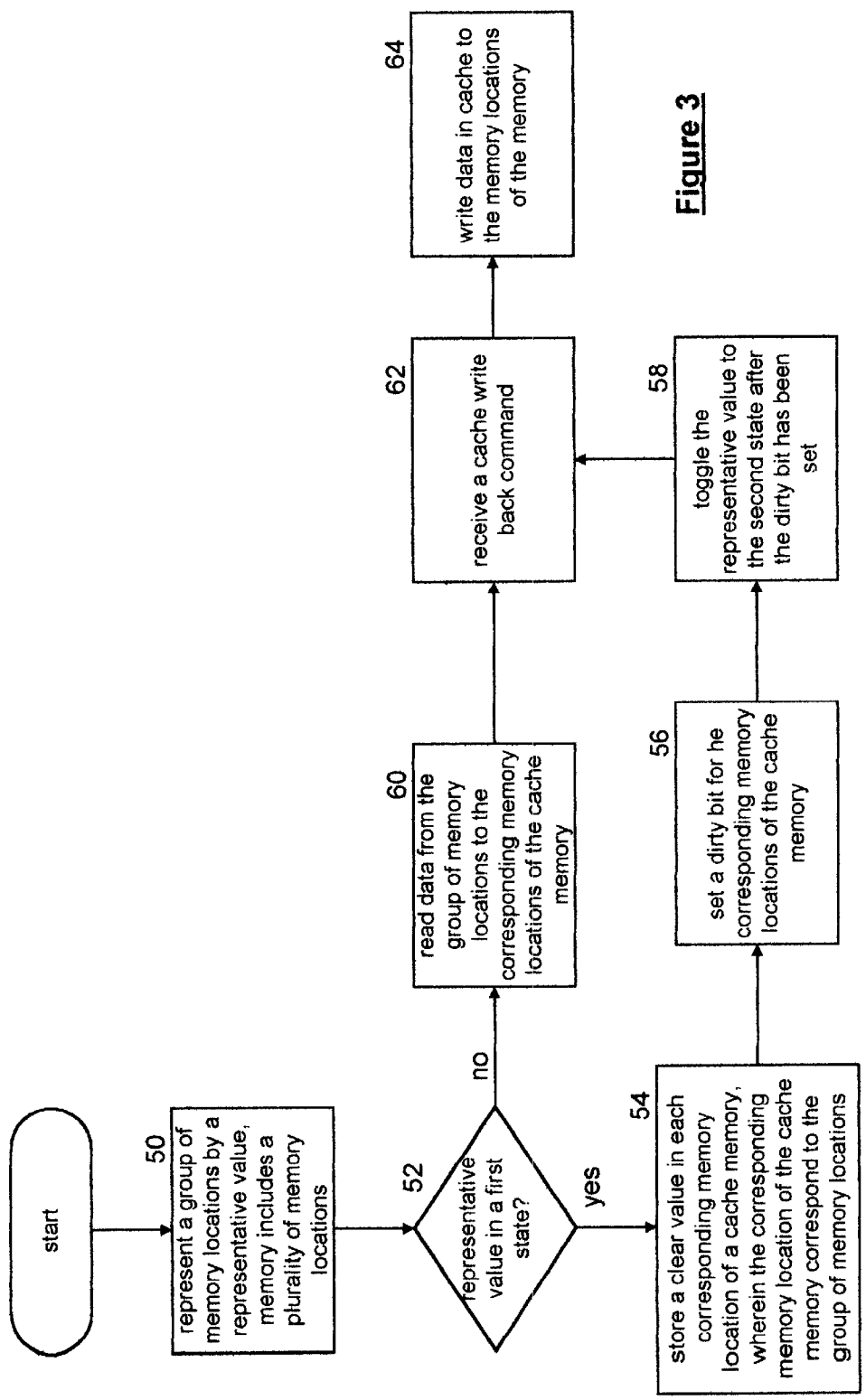
FIG. 3 illustrates a logic diagram of a method for clearing memory in accordance with the present invention.

FIG. 3 illustrates a logic diagram of a method for clearing memory in accordance with the present invention. The process begins at step 50 where a group of memory locations within a memory are represented by a representative value. Typically, a memory will include a plurality of groups of memory locations. The memory may correspond to a Z frame buffer, where the groups of memory locations correspond to groups of pixels. In addition, the group of memory locations may be represented by a hierarchical representative value, where the group of representative values is one of a plurality of group of representative values. This was discussed with reference to FIG. 2.

The process then proceeds to step 52 where a determination is made as to whether the representative value is in a first state. If so, the process proceeds to step 54 where a clear value is stored in each corresponding memory location of a cache memory, (i.e., a line of cache memory that is associated with a group of memory locations is filled with a clear value). Note that the clear value may be retrieved from a clear value register. The process then proceeds to step 56 where a dirty bit is set for the corresponding memory locations of a cache memory. Note that when the dirty bit is not set, the data stored in the cache memory matches the data stored in the main memory, and when it is set, the data does not match. The process then proceeds to step 58 where the representative value is toggled to the second state after the dirty bit has been set. The process then proceeds to step 62, which is discussed below.

If the representative value was not in the first state, the process proceeds to step 60 where data is read from the group of memory locations into corresponding memory locations of the cache memory. The process then proceeds to step 62 to receive a cache write-back command. The process then proceeds to step 64 where the data in the cache (i.e., the data that has been written in at step 60 or the clear value which was stored at step 54), is written into the memory locations of the group of memory locations.

FIG. 4 illustrates a logic diagram of an alternate method of clearing memory in accordance with the present invention. The process begins at step 70 where a group of memory locations are represented by a representative value. Note that the memory includes a plurality of memory locations that are grouped into a plurality of groups. The group of memory locations may be represented by a hierarchical representative value, where the group of representative values is one of a plurality of groups of representative value. This was illustrated with reference to FIG. 2.

The process then proceeds to step 72 where a determination is made as to whether value is in a first state. If so, the process proceeds to step 74 where a clear value is stored in each corresponding memory location of a cache memory, wherein the corresponding memory locations of the cache memory correspond to the memory locations within the group. The process then proceeds to step 78, which will be discussed below.

If the representative value was not in the first state, the process proceeds to 76. At step 76, data is read from the group of memory locations to the corresponding memory locations of cache memory. The process then proceeds to step 78 where a cache write-back command is received. The process then proceeds to step 80 where data in the cache memory is written to the corresponding memory locations of the memory. The data written into the corresponding memory location may be the clear value or the data retrieved at step 76.

The preceding discussion has presented a method and apparatus for a fast and efficient mechanism for clearing memory. By utilizing a representative value, on-chip memory may be utilized to efficiently clear groups of memory locations in off-chip memory. Such an implementation is particularly useful in video graphics processing where the main memory is representative of a Z frame buffer.

What is claimed is:

1. A method for clearing memory, the method comprises the steps of:
   a) representing a group of memory locations by a representative value, wherein the memory includes a plurality of groups of memory locations;
   when the representative value is in a first state:
   b) storing a clear value in each corresponding memory location of a cache memory which is different memory from the memory being cleared, wherein the corresponding memory locations of the cache memory correspond to the group of memory locations;
   c) setting a dirty bit for the corresponding memory locations of the cache memory, and changing the representative value to a second state;
   d) when the representative value is in a second state, reading data from the group of memory locations to the corresponding memory locations of the cache memory;
   e) receiving a cache write-back command and writing into the memory locations of the group of memory locations the data from the corresponding memory locations of the cache.

2. The method of claim 1, wherein the memory further comprises a z frame buffer, wherein the group of memory locations corresponds to a group of pixels.

3. The method of claim 1, wherein step (a) further comprises representing a group of representative values by a hierarchy representative value, wherein the group of representative values is one of a plurality of groups of representative values.

4. The method of claim 1, wherein step (c) further comprises toggling the representative value to the second state after the dirty bit has been set.

5. The method of claim 1 further comprises:
   receiving a cache write back command;
   when the dirty bit is set, writing the clear value for each of the corresponding memory locations of the cache memory to the group of memory locations; and
   when the dirty bit is not set, retaining data stored in the group of memory locations.

6. The method of claim 1, wherein step (b) further comprises retrieving the clear value from a register.

7. The method of claim 1, wherein step (b) further comprises retrieving the clear value from a register.

8. A method for clearing memory, the method comprises the steps of:
   a) representing a group of memory locations by a representative value, wherein the memory includes a plurality of groups of memory locations;
   b) when the representative value is in a first state, storing a clear value in each corresponding memory location of a cache memory which is different memory from the memory being cleared, wherein the corresponding memory locations of the cache memory correspond to the group of memory locations, and thereafter changing the representative value to a second state;
   c) when the representative value is in a second state, reading data from the group of memory locations to the corresponding memory locations of the cache memory; and
   d) writing data stored in the corresponding memory locations of the cache memory to the group of memory locations when a cache write back command is received.

9. The method of claim 8, wherein the memory further comprises a z frame buffer, wherein the group of memory locations corresponds to a group of pixels.

10. The method of claim 8, wherein step (a) further comprises representing a group of representative values by a hierarchy representative value, wherein the group of representative values is one of a plurality of groups of representative values.

11. A memory controller that controls a memory, the memory controller comprises:
    a processing module; and
    memory operably coupled to the processing module, wherein the memory stores operating instructions that cause the processing module to (a) represent a group of memory locations by a representative value, wherein the memory includes a plurality of groups of memory locations;
    when the representative value is in a first state:
    (b) store a clear value in each corresponding memory location of a cache memory which is different memory from the memory being cleared, wherein the corresponding memory locations of the cache memory correspond to the group of memory locations;
    (c) set a dirty bit for the corresponding memory locations of the cache memory and change the representative value to a second state; and
    (d) read data from the group of memory locations to the corresponding memory locations of the cache memory when the representative value is in a second state.

12. The memory controller of claim 11, wherein the memory further comprises operating instructions that cause the processing module to represent a group of representative values by a hierarchy representative value, wherein the group of representative values is one of a plurality of groups of representative values.

13. The memory controller of claim 11, wherein the memory further comprises operating instructions that cause the processing module to:
    receive a cache write back command;
    write the clear value for each of the corresponding memory locations of the cache memory to the group of memory locations when the dirty bit is set; and
    retain data stored in the group of memory locations when the dirty bit is not set.

14. A memory controller that controls a memory, the memory controller comprises:
    a processing module; and
    memory operably coupled to the processing module, wherein the memory stores operating instructions that cause the processing module to (a) represent a group of memory locations by a representative value, wherein the memory includes a plurality of groups of memory locations;
    (b) store a clear value in each corresponding memory location of a cache memory which is different memory from the memory being cleared when the representative value is in a first state and thereafter change the representative value to a second state, wherein the corresponding memory locations of the cache memory correspond to the group of memory locations;

(c) read data from the group of memory locations to the corresponding memory locations of the cache memory when the representative value is in a second state; and (d) write data stored in the corresponding memory locations of the cache memory to the group of memory locations when a cache write back command is received.

15. The memory controller of claim 14 wherein the memory further comprises operating instructions that cause the processing module to represent a group of representative values by a hierarchy representative value, wherein the group of representative values is one of a plurality of groups of representative values.

16. The memory controller of claim 14, wherein the memory further comprises operating instructions that cause the processing module to retrieve the clear value from a register.

* * * * *